(12) United States Patent
Terauchi et al.

(10) Patent No.: US 7,368,840 B2
(45) Date of Patent: May 6, 2008

(54) BRUSHLESS MOTOR

(75) Inventors: Takahiro Terauchi, Kiryu (JP); Chikahumi Sugai, Kiryu (JP); Takeshi Yamazaki, Kiryu (JP); Satoru Negishi, Kiryu (JP); Hideaki Fujii, Kiryu (JP)

(73) Assignee: Mitsuba Corporation, Gunma-Ken (JP)

( * ) Notice: Subject to any disclaimer, the term of this patent is extended or adjusted under 35 U.S.C. 154(b) by 0 days.

(21) Appl. No.: 11/547,923

(22) PCT Filed: Apr. 8, 2005

(86) PCT No.: PCT/JP2005/006969

§ 371 (c)(1),
(2), (4) Date: Oct. 5, 2006

(87) PCT Pub. No.: WO2005/099068

PCT Pub. Date: Oct. 20, 2005

(65) Prior Publication Data

US 2007/0210658 A1    Sep. 13, 2007

(30) Foreign Application Priority Data

Apr. 9, 2004  (JP) .............................. 2004-115417

(51) Int. Cl.
*H02K 11/00* (2006.01)
(52) U.S. Cl. .................. 310/68 D; 310/89; 310/71
(58) Field of Classification Search .............. 310/68 B, 310/89, 68 D, 71
See application file for complete search history.

(56) References Cited

U.S. PATENT DOCUMENTS

| 2004/0051404 A1* | 3/2004 | Kurosawa et al. ........ 310/49 R |
| 2004/0119345 A1* | 6/2004 | Takano ........................ 310/43 |
| 2005/0183902 A1* | 8/2005 | Segawa et al. ............. 180/444 |

FOREIGN PATENT DOCUMENTS

| JP | 3-124761 | | 12/1991 |
| JP | 7-11866 | | 2/1995 |
| JP | 9-65617 | | 3/1997 |
| JP | 09065617 A | * | 3/1997 |
| JP | 9-182403 | | 7/1997 |
| JP | 09182403 A | * | 7/1997 |
| JP | 10-94231 | | 4/1998 |
| JP | 10094231 A | * | 4/1998 |
| JP | 2002136055 A | * | 5/2002 |

OTHER PUBLICATIONS

International Search Report of PCT/JP2005/006969 dated Jul. 12, 2005.

* cited by examiner

*Primary Examiner*—Thanh Lam
(74) *Attorney, Agent, or Firm*—Kenyon & Kenyon LLP

(57) ABSTRACT

The brushless motor includes: a housing; a stator which is stored and fixed in the housing; a rotor which is rotatably arranged inside the stator; a bracket which is fixed to the housing; a rotation detector which is fixed to the bracket and the housing and detects a rotation position of the rotor; and an engagement device which restrains movement of the bracket along a circumferential direction with respect to the housing.

5 Claims, 7 Drawing Sheets

BRUSHLESS MOTOR

CROSS-REFERENCE TO RELATED APPLICATIONS

This application is a National Phase Application of PCT/JP2005/006969 filed on Apr. 8, 2005, which claims priority to Japanese Patent Application No. 2004-115417, filed Apr. 9, 2004, the contents of each of which are incorporated herein by reference.

BACKGROUND OF THE INVENTION

In a brushless motor, after inserting a rotor into a cylindrical housing having a bottom, a bracket is fixed on an opening of the housing, and the rotor is rotatably held by bearings which are provided on the bottom of the housing and the bracket.

The opening of the housing is a round form and a flange is formed in a periphery thereof. The flange is provided with bolt holes for fixing the bracket to the housing. The bracket also has a flange which has bolt holes.

Inside of the bracket, a stator of resolver which detects a rotation angle (i.e., a resolver stator) is provided. The resolver stator is fixed by screws which are inserted into elongated holes formed on the bracket (for example, refer to Japanese Unexamined Patent Application, First Publication No. H09-182403).

In order to apply an electric current to the brushless motor at the best timing, it is necessary to adjust a position between the resolver stator and a rotor of the resolver (i.e., a resolver rotor) previously. At this occasion, the position is adjusted by loosening the screws which are inserted into the elongated holes of the bracket and rotating the resolver stator with respect to the bracket around a rotation shaft.

DETAILED DESCRIPTION OF THE INVENTION

Problems to be Solved by the Invention

There is slack between the housing and the bracket, so that errors are likely to occur in a setting angle of the bracket to the housing. Accordingly, the position of resolver stator and the resolver rotor are adjusted in a state in which the housing and the bracket are unstably located in the position. Therefore, considering the positioning differences between the housing and the bracket, it is necessary that the elongated holes for fixing the resolver stator be elongated for an adjustment. If the elongated holes are elongated for the adjustment, layout performance of the bracket is deteriorated and there is a problem in that the bracket increases in size. Furthermore, since the adjustment range of the resolver is wide, there is a problem in that the adjustment operation takes a long time.

In addition, when such a brushless motor is used, if a vibration or an impact which loosens the screws (or bolts) fixing the housing to the bracket is applied, the position of the bracket with respect to the housing is shifted, and as a result, there is a possibility of the position of the resolver stator slipping.

The present invention has been realized in view of the above-described situation and has objects to improve the assembling performance by reducing the adjustment range of the resolver and provides a brushless motor which has a good layout performance and reliability.

Means for Solving the Problem

The present invention is a brushless motor having: a housing; a stator which is stored and fixed in the housing; a rotor which is rotatably arranged inside the stator; a bracket which is fixed to the housing; a rotation detector which is fixed to the bracket and the housing and detects a rotation position of the rotor; and an engagement device which restrains a movement of the bracket along a circumferential direction with respect to the housing.

In this brushless motor, the engagement device restrains a peripheral position of the bracket with respect to the housing. Therefore, the bracket can be fixed at a prescribed position of the housing, so that positional slippage is prevented from occurring between the housing and the bracket. Accordingly, an adjustment range in assembling the rotation detector can be reduced.

In this brushless motor, it is preferable that the engagement device have: a slit which is provided on a periphery of the housing; and a rib which is provided on the bracket and engages with the slit (a bracket rib).

In this brushless motor, the circumferential movement of the bracket with respect to the housing can be restrained by engaging the bracket rib to the slit of the housing.

Furthermore, in this brushless motor, it is preferable that: the bracket has a coupler which is provided at a periphery thereof, and to which an electric cable is connected, and the rib of the bracket is provided at a side of the coupler.

Since the bracket rib is provided on the side of the coupler of the bracket, this brushless motor can maintain the strength thereof in comparison with a case in which a bracket rib individually protrudes.

In addition, in this brushless motor, the rotation detector may be a resolver.

In this brushless motor, a resolver stator is attached to the bracket, and a resolver rotor is attached to a rotor of a motor. The adjustment range of assembling the resolver stator can be reduced by enabling the bracket to be fixed to a prescribed portion of the housing.

Advantageous Effects of the Invention

According to the present invention, since the engagement device which restrains the circumferential movement of the bracket with respect to the housing is provided, slippage between the housing and the bracket when the bracket is attached to the housing is prevented. The adjustment range can be reduced when adjusting the rotational position of the rotation detector; consequently, the assembling efficiency can be improved. Furthermore, since a hole which is used for the adjustment of the rotation detector can be made small, the layout performance can be improved and the bracket size can be minimized. In addition, resistance to vibration or the like can be increased, and the reliability of the brushless motor can be improved.

DESCRIPTION OF THE REFERENCE SYMBOLS

Figure 1:
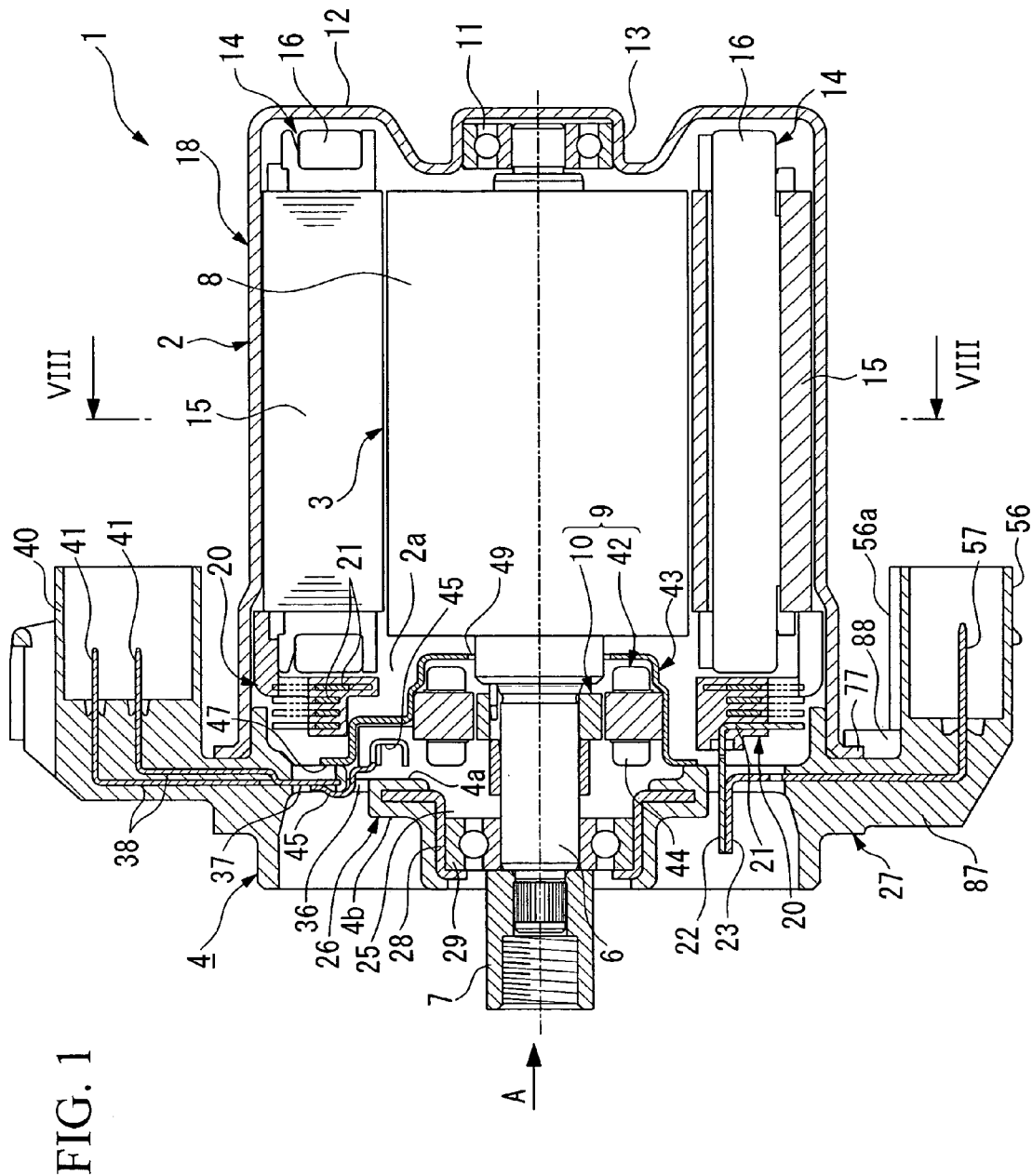
FIG. 1 is a sectional view showing an embodiment of a brushless motor of the present invention.

1: brushless motor
2: housing
2a: opening
3: rotor
4: bracket
9: resolver (rotation detector)
18: stator
42: resolver stator
56: coupler
56a: inside surface (side)
77: flange (engagement device)
78: slit (engagement device)
88: bracket rib (engagement device, rib)

BEST MODE FOR CARRYING THE INVENTION

The best mode for carrying the invention will be explained in detail with reference to the drawings.

As shown in FIG. 1, in a brushless motor 1, a rotor 3 is inserted into a cylindrical housing 2 having a bottom. A bracket 4 is attached to an opening 2a of the housing 2.

The rotor 3 has a rotation shaft 6. A joint 7 which is connected to a rotation shaft of another device is pressed into a distal end of the rotation shaft 6. A magnet unit 8 which is constructed from magnets cyclically (and alternatively) arranged along a circumferential direction so as to adjoin opposite poles thereof is fixed to the other end (a bottom portion 12 side of the housing 2) of the rotation shaft 6. A resolver rotor 10 which forms a resolver 9 as a rotation detector is fixed to the rotation shaft 6 on a further distal end side (the opening 2a side) than the magnets 8. The other end of the rotation shaft 6 (an end of the bottom portion 12 side) is rotatably supported by a bearing 11.

The bearing 11 is pressed into a recessed portion 13 formed at a center of the bottom portion 12 of the housing 2. Cores 16 such as iron cores are stored in the interior of the housing 2. Electromagnetic coils 14 are formed by winding conductive wires 15 around the cores 16. The electromagnetic coils 14 are provided on each of phases (U-phase, V-phase, and W-phase) which are electrically connected and disposed inside the housing 2 so as to be opposed inside the housing 2.

Figure 2:
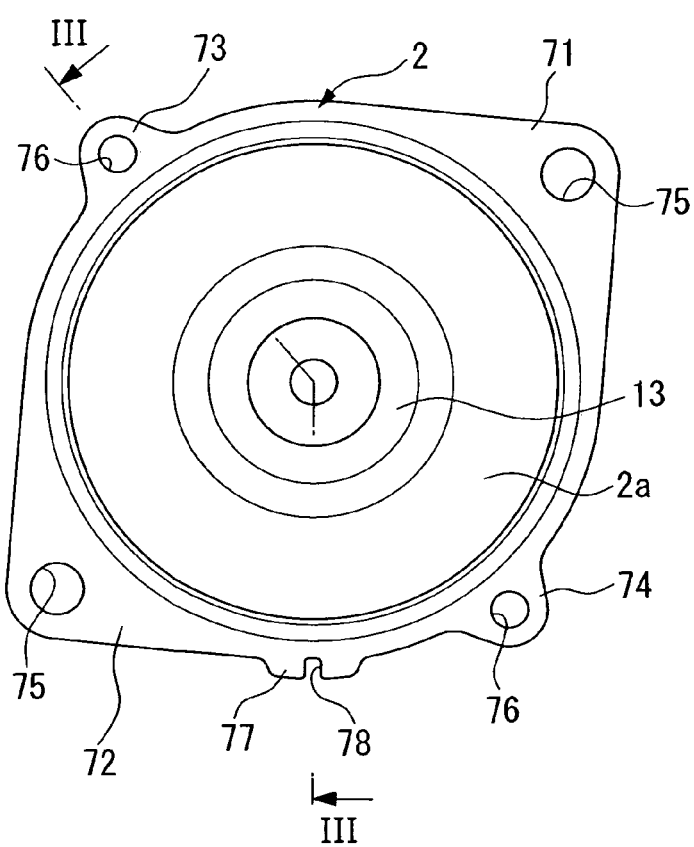
FIG. 2 is a view of a housing taken from the A direction in FIG. 1
Figure 3:
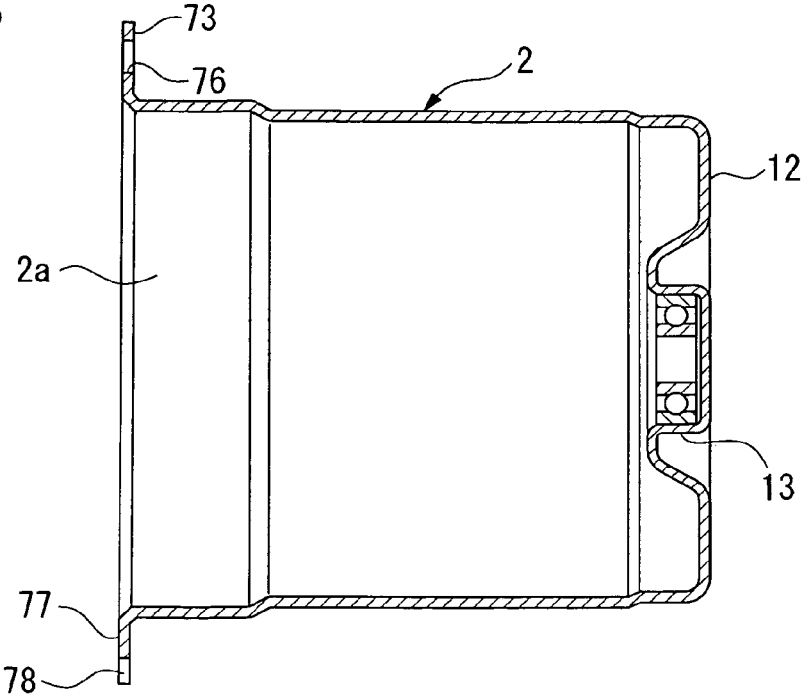
FIG. 3 is a sectional view taken along the III-III line in FIG. 2.

As shown in FIGS. 2 and 3, a periphery of the opening 2a of the housing 2 radially extends toward the outside. Furthermore, four flanges 71, 72, 73, and 74 which protrude radially outside and are larger than the other portion are formed in the periphery. The flanges 71, 72, 73, and 74 are disposed at regular intervals along the circumferential direction. The flange 71 and the flange 72 are disposed so as to be opposed. Bolt holes 75 for fixing a frame of the other device are formed at the flanges 71, 72 respectively. In addition, the flange 73 and the flange 74 are disposed so as to be opposed. Bolt holes 76 for fixing the bracket 4 are formed at the flanges 73, 74 respectively.

A flange 77 for position adjusting which constitutes an engagement device is formed at the periphery between the flange 72 and the flange 74. A slit 78 extending along the radial direction is formed on the flange 77 for position adjusting.

As shown in FIG. 1, terminal units 20 are disposed inside the housing 2 in a vicinity of the opening 2a. A plurality of terminals 21 which are electric conductors are arranged on the terminal units 20. The terminals 21 are stacked in an axial direction so as to interpose insulant layers therebetween. Each of the terminals 21 is connected to a starting end and a terminating end of the wound wire 15 of the electromagnetic coil 14. Furthermore, terminals 22 which extend from the terminal unit towards the distal end side are fixed to the terminals 21. The terminals 22 are connected to terminals 23 passing through the bracket 4 and reaching the outside. The terminals 23 are fixed to the bracket 4.

Figure 4:
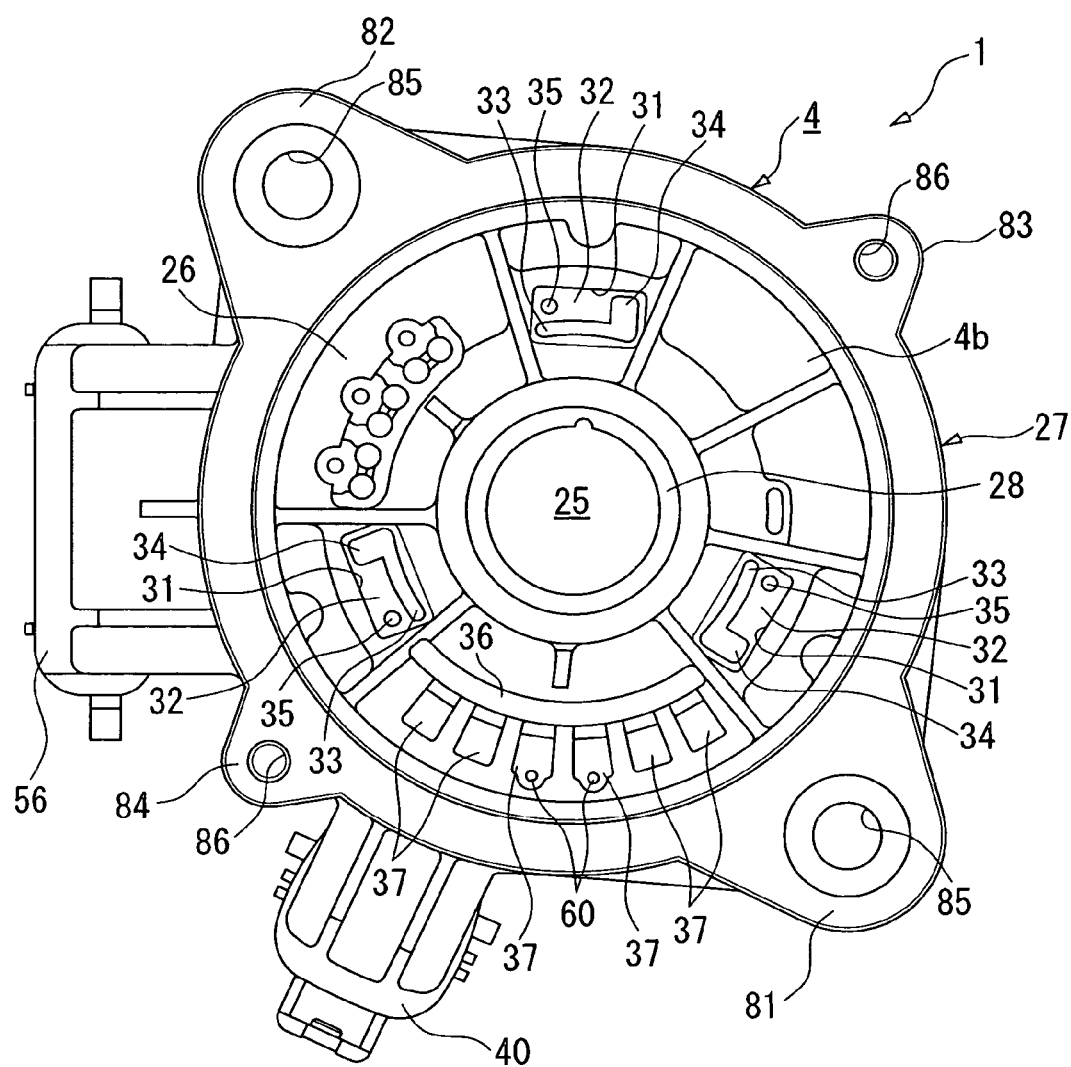
FIG. 4 is a view taken from the A direction in FIG. 1 showing an outside of a bracket before attaching a resolver case thereto.

As shown in FIG. 1 and FIG. 4, the bracket 4 has a substantially discoidal base portion 26 having an opening 25 at a center thereof. A side portion 27 which is longer than the base portion 26 in length along the axial direction of the rotation shaft 6 is formed at the periphery of the base portion 26. The bracket 4 is molded from an insulating resin, and a metal plate 28 is inserted into the inner periphery of the opening 25 of the base portion 26. It is preferable to use a polyphenylene sulphide (PPS) resin, which is a crystalline thermoplastic. However, another resin may be used.

The plate 28 is formed in a substantially annular shape, and is bent along the axis of the rotation shaft 6 so that an end portion of the inner side protrudes to the opening 25 of the base portion 26. A bearing 29 is pressed into the inside of the bent portion of the plate 28 and rotatably supports the distal end of the rotor 3.

As shown in FIG. 4, three elongated holes 31 which pass through the base portion 26 along the axial direction of the bracket 4 are provided at regular intervals on a circle concentric to the axis of the bracket 4 (i.e., the axis of the rotation shaft 6). A peripheral portion of the plate 28 (i.e., pedestals 32 are) is exposed at three parts through each of the elongated holes 31. First through-holes 33 which are elongated holes extending along the circumferential direction are formed at the pedestals 32. Each of the first through-holes 33 has an extension portion 34 extending from one end to the outside along the diametrical direction. These extension portions 34 are disposed at the pedestals 32 at regular intervals on a circle concentric to the axis of the bracket 4 (i.e., the axis of the rotation shaft 6). At each of the pedestals 32, recessed portions 35 are respectively formed so as to be exposed through the elongated holes 31. The recessed portions 35 are used for supporting the plate 28 while insert molding.

A second through-hole 36 which elongates along the circumferential direction is formed between the adjacent first through-holes 33. The second through-hole 36 passes through the bracket 4 from an inner surface 4a to an outer surface 4b of the bracket 4 along the axial direction of the rotation shaft 6. Six connection portions 37 are provided at regular intervals along the circumferential direction in a sectorial area outer circumference of the second through-hole 36 between both ends of the second through-hole 36. As shown in FIG. 1, the connection portions 37 form one end portion of conductive terminals 38. The terminals 38 run through the inside of the bracket 4 and form terminals 41 of a coupler 40 which is provided at the side portion 27. Recessed portions 60 which are provided at the connection portions 37 are used while insert molding.

A resolver case 43 which stores a stator (i.e., resolver stator) 42 of the resolver 9 is attached to the bracket 4.

Figure 5:
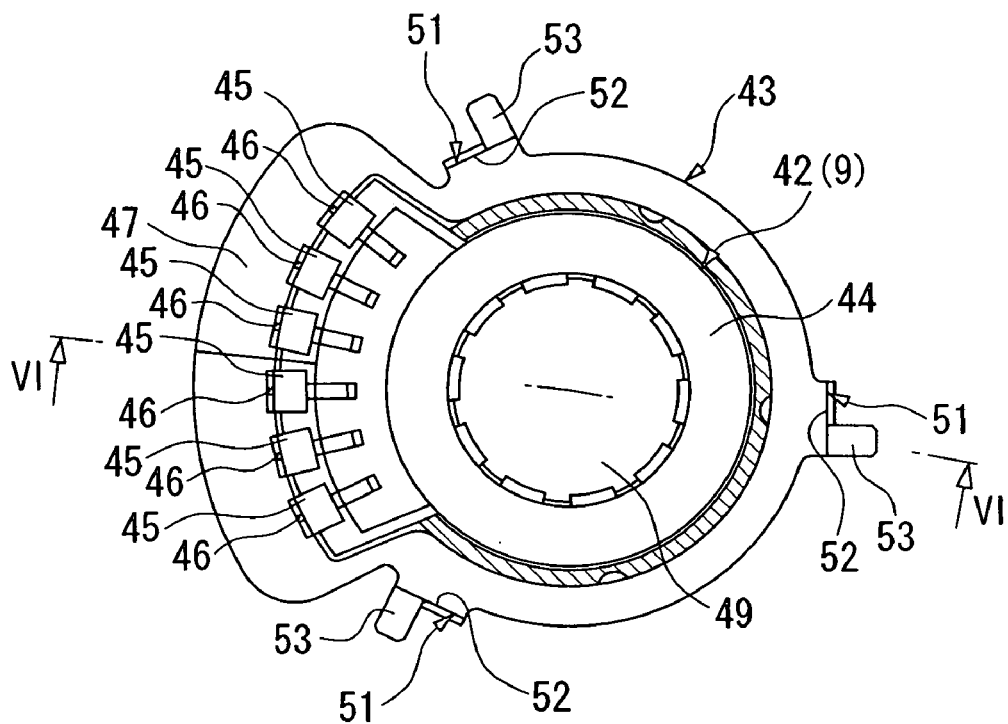
FIG. 5 is a plan view showing a resolver stator and the resolver case.
Figure 6:
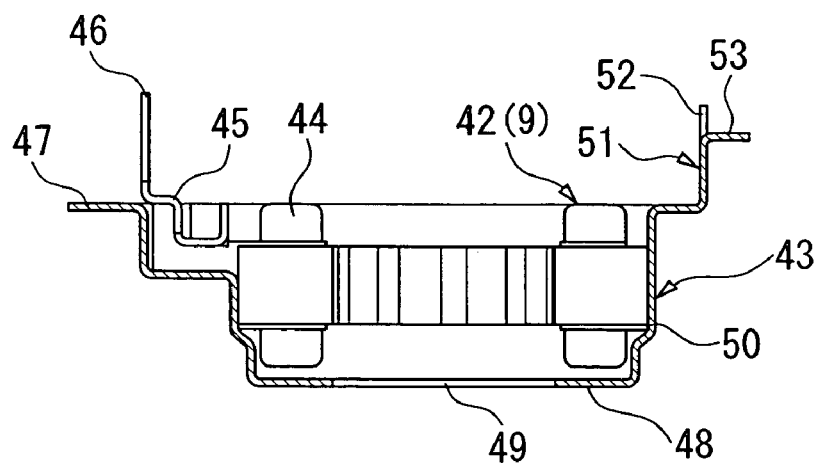
FIG. 6 is a sectional view taken along the VI-VI line in FIG. 5.

As shown in FIG. 5 and FIG. 6, excitation coils 44 are arranged annularly in the resolver stator 42. When the bracket 4 is attached to the housing 2, the resolver rotor 10 is disposed inside the excitation coils 44 (see FIG. 1).

Wires of the excitation coils 44 are connected to stator terminals 45. The stator terminals 45 are six electric conductors which are provided at prescribed intervals along the circumferential direction. Pin-shaped resolver terminals 46 are arranged so as to stand on a periphery of each of the stator terminals 45.

The resolver stator 42 is housed in the resolver case 43. The resolver case 43 is formed in a shape having steps by press working or the like. An opening 49 is formed in a center of a bottom portion 48 of the resolver case 43, and the rotor 3 is inserted thereinto. A periphery of the bottom portion 48 extends along a substantially axial direction (i.e., the axial direction of the rotation shaft 6) and forms a cylindrical side portion 50. The side portion 50 and the bottom portion 48 form a recessed portion which stores the resolver stator 42. As shown in FIG. 6, portions of an upper edge of the side portion 50 of the resolver case 43 project along the axial direction and form resolver claws 51.

As shown in FIG. 5, three of the resolver claws 51 are provided at regular intervals along the circumferential direction. At a distal end of each of the resolver claws 51, an adjustment claw 52 extending substantially parallel to the axial direction of the rotation shaft 6 and an engagement claw 53 extending outward in the radial direction are provided.

A flange 47 is formed at the resolver case 43 at a bent portion so as to follow the shape of the stator terminals 45 of the resolver stator 42.

Figure 7:
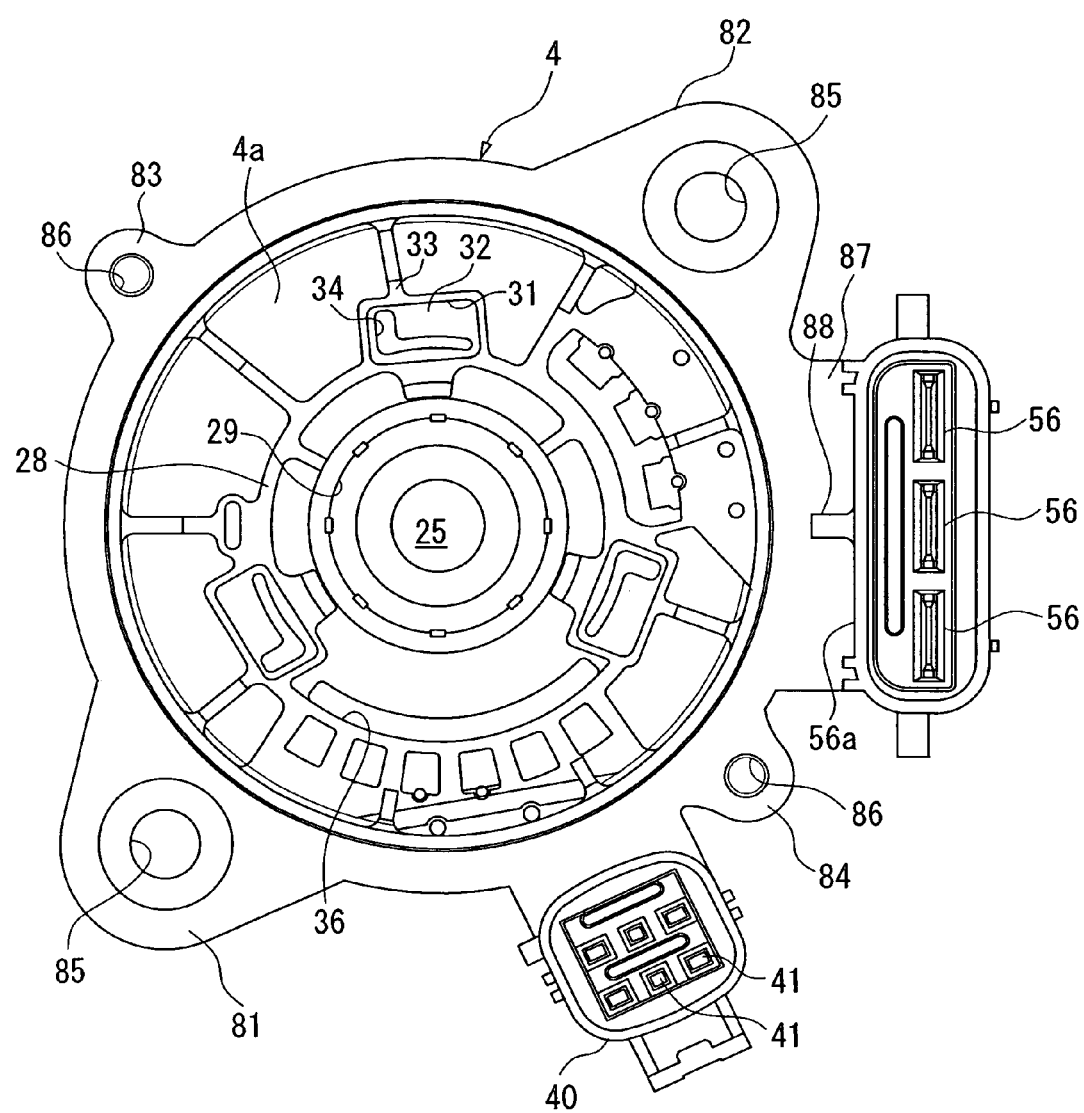
FIG. 7 is a view showing an inside of the bracket.
Figure 8:
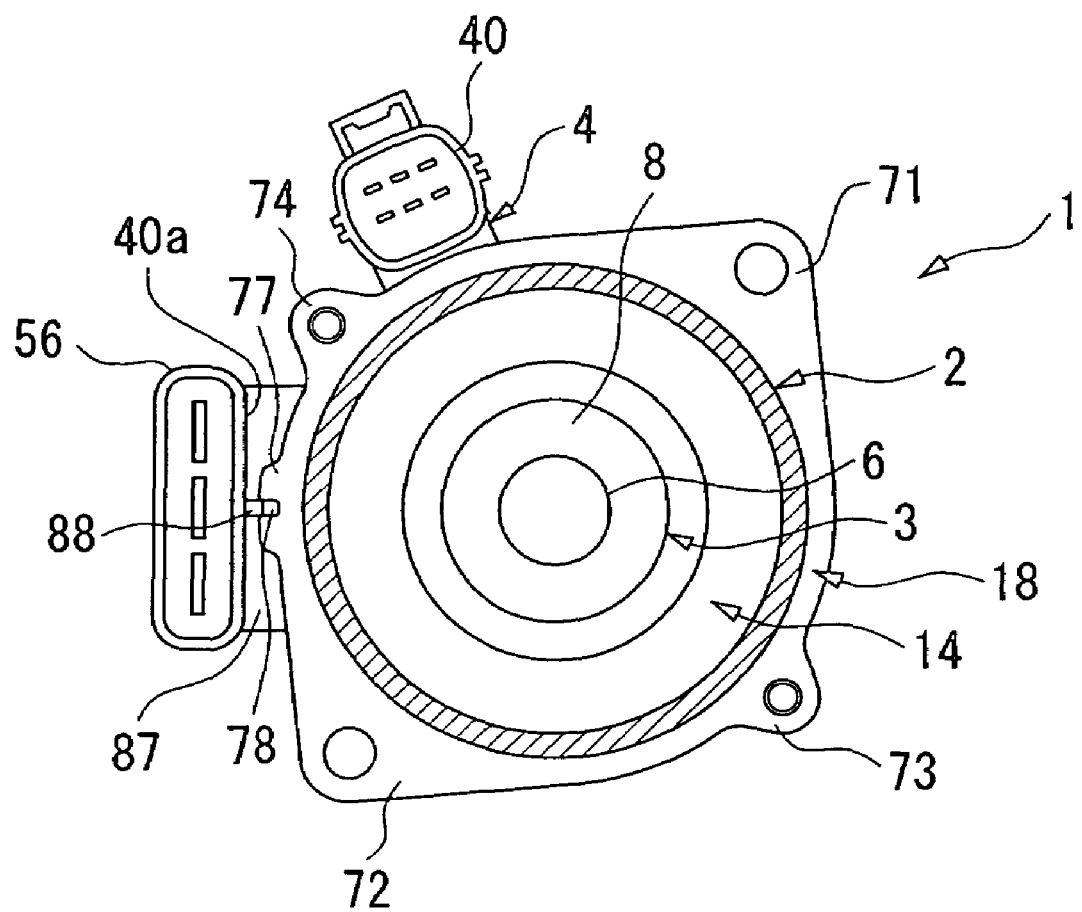
FIG. 8 is a sectional view taken along the VIII-VIII line in FIG. 1.

As shown in FIG. 7, four flanges 81, 82, 83, and 84 extend from the side portion 27 of the bracket 4. The flange 81 and the flange 82 are disposed so as to be opposed. Bolt holes 85 are formed at the flanges 81 and 82, respectively. The flange 83 and the flange 84 are disposed so as to be opposed. Bolt holes 86 are formed at the flanges 83 and 84, respectively. The outer periphery of the side portion 27 between the flanges 82 and 84 extends outward along the radial direction and forms an extension 87. As shown in FIG. 1 and FIG. 7, a distal end of the extension 87 extends along the axis of the rotation shaft 6 toward a proximal end side (the housing 2 side), and couplers 56 are provided there. Terminals 57 of the couplers 56 are connected to the terminals 23 disposed in the bracket 4. A bracket rib (i.e., rib) 88 which constitutes the engagement device is formed between an inside surface 56a of the coupler 56 fronting on the housing 2 and an outer surface of the extension 87. The bracket rib 88 has a shape engageable with the slit 78 (see FIG. 2) which is provided on the flange 77 of the housing 2.

Next, assembling work of the brushless motor 1 will be explained.

Firstly, as shown in FIG. 1, the bearing 11 is pressed into the recessed portion 13 of the housing so as to dispose the electromagnetic coils 14 which are formed by winding the wires 15 around the cores 16. Then, the terminal unit 20 is attached so as to contact the cores 16 of the electromagnetic coils 14 and drawn ends of the wires of the electromagnetic coils 14 are connected with the terminals 21.

Further, the rotor 3 is inserted into a space formed dividing inside the housing 2 with the electromagnetic coils 14 and the other end of the rotation shaft 6 is supported by the bearing 11.

On the other hand, the resolver stator 42 is attached to the bracket 4. That is to say, firstly, after housing the resolver stator 42 into the resolver case 43, the resolver case 43 is temporarily fixed to the bracket 4. When temporarily fixing, the resolver terminals 46 which extend from the stator terminals 45 penetrate through the second through-hole 36. At the same time, the resolver claws 51 penetrate through the first through-holes 33. At this time, the engagement claws 53 are drawn out to the pedestals 32 through the extension portions 34 of one end side of the first through-holes 33.

Further, by pushing the adjustment claws 52 along the circumferential direction so that the resolver case 43 is rotated; the engagement claws 53 are moved from the extension holes of the first through-holes 33 to the pedestals 32 which have no openings. As a result, the engagement claws 53 are engaged with the pedestals 32 along the axial direction and the resolver case 43 is temporarily fixed to the bracket 4.

The bracket 4 to which the resolver case 43 is temporarily fixed is inserted into the opening 2a of the housing 2 so as to cover the opening 2a, and fixed by bolts. Specifically, the rotation shaft 6 of the rotor 3 which is inserted into the housing 2 is inserted through the bracket 4, the bracket rib 88 of the bracket 4 and the slit 78 of the housing 2 are engaged, and the circumferential position of the bracket 4 with respect to the housing is fixed. At this time, the flange 81 of the bracket 4 and the flange 71 of the housing 2 are joined. Further, the flange 82 and the flange 72, the flange 83 and the flange 73, and the flange 84 and the flange 74 are joined, respectively. Then, the bolt holes 76 and 86 of the flanges 73 and 83 are bound with the bolt holes 76 and 86 of the flanges 74 and 84 by bolts and nuts, and the housing 2 and the bracket 4 are firmly fixed.

Next, the resolver stator 42 is moved along the circumferential direction by an automatic machine (not illustrated) and is adjusted in position, the resolver terminals 46 are welded to the connection portions 37, and the engagement claws 53 are welded to the pedestals 32. As a result, the resolver stator 42 and the resolver case 43 are fixed to the bracket 4.

Specifically, the automatic machine obtains an output of the resolver stator 42 from the resolver terminals 46. The angle is adjusted so that the output of the resolver stator 42 shows a prescribed value by hooking the adjustment claws 52 extending along the axial direction of the resolver case 43 so as to rotate the resolver stator 42 with the resolver case 43 along the circumferential direction. After adjusting the angle, and while keeping the position, the engagement claws 53 are welded to the pedestals 32. Further, distal ends of the resolver terminals 46 are bent outward in the radial direction and are made to contact with the connection portions 37 of the bracket 4, and the connection portions 37 are welded to the resolver terminals 46. As a result, the resolver case 43 is fixed to the bracket 4, and the output of the resolver stator 42 can be obtained from the coupler 40 via the resolver terminals 46 and the terminals 38.

According to the above embodiment, since the slit 78 is provided on the flange 77 of the housing 2, and since the bracket rib 88 which engages to the slit 78 is provided at the outer peripheral portion of the bracket 4, by engaging the bracket rib 88 and the slit 78 when attaching the bracket 4, the bracket 4 is prevented from moving along the circumferential direction. Therefore, since slack of the bracket 4 along the rotation direction is eliminated and slippage is prevented, the adjustment range of the position of the resolver 9 can be reduced in comparison with the conventional brushless motor, and the working efficiency can be improved. At the same time, since the first through-holes 33 which are used for the position adjustment of the resolver 9 can be reduced in size, the layout performance of the bracket 4 can be improved, and the bracket 4 can be reduced in size. Furthermore, since the positional slippage of the bracket 4 can be prevented, the reliability can be improved.

In addition, since the bracket rib 88 is provided at the inside surface 56a of the coupler 56, the bracket rib 88 can be improved in strength and can be firmly engaged to the slit 78.

The slit 78 can be formed easily by press working of the housing 2. Furthermore, since the bracket 4 is made from a resin, the bracket rib 88 can be easily formed. Therefore, the housing 2 and the bracket 4 can be manufactured without a complex manufacturing method or an expensive device.

The present invention should not be limited to the above-mentioned embodiment and can be broadly applied without departing from the spirit of the invention.

For example, it may be arranged such that a boss is provided at the housing 2 by press working and a recessed portion which engages the boss is formed at the bracket 4. This enables same advantageous effects as those of the above embodiment without a great alternation to the manufacturing process.

Furthermore, it may be arranged such that a boss is formed at a portion, which is inserted into the housing 2, of the side portion 27 of the resin bracket 4 and a recessed portion which engages to the boss is provided at the core 15 which is housed into the housing 2. The assembling accuracy of the bracket 4 with respect to a stator 18 (i.e., the housing 2) can be further improved since the bracket 4 can be reliably fixed to the core 16 without a great alternation to the manufacturing process.

Furthermore, a plurality of engagement devices may be provided. For example, two engagement devices may be disposed so as to be opposed. In addition, an engagement device including the slit 78 and the bracket rib 88 may be combined with the other engagement device including a boss and a recessed portion.

Furthermore, the material of the bracket 4 is not limited to a resin and may be metal, for example.

The rotation detector is not limited to the resolver 9 and a Hall IC (Integrated Circuit) or the like may be used. The resolver has high resolution and can detect an absolute position. Therefore, the resolver is suited to a use requiring high controllability, although it requires high costs. On the other hand, since the Hall IC estimates and detects a current position by using a pulse generated by switching of the magnetic pole of a sensor magnet, the Hall IC is not suited to use requiring high controllability, although the costs can be reduced.

Figure 9:
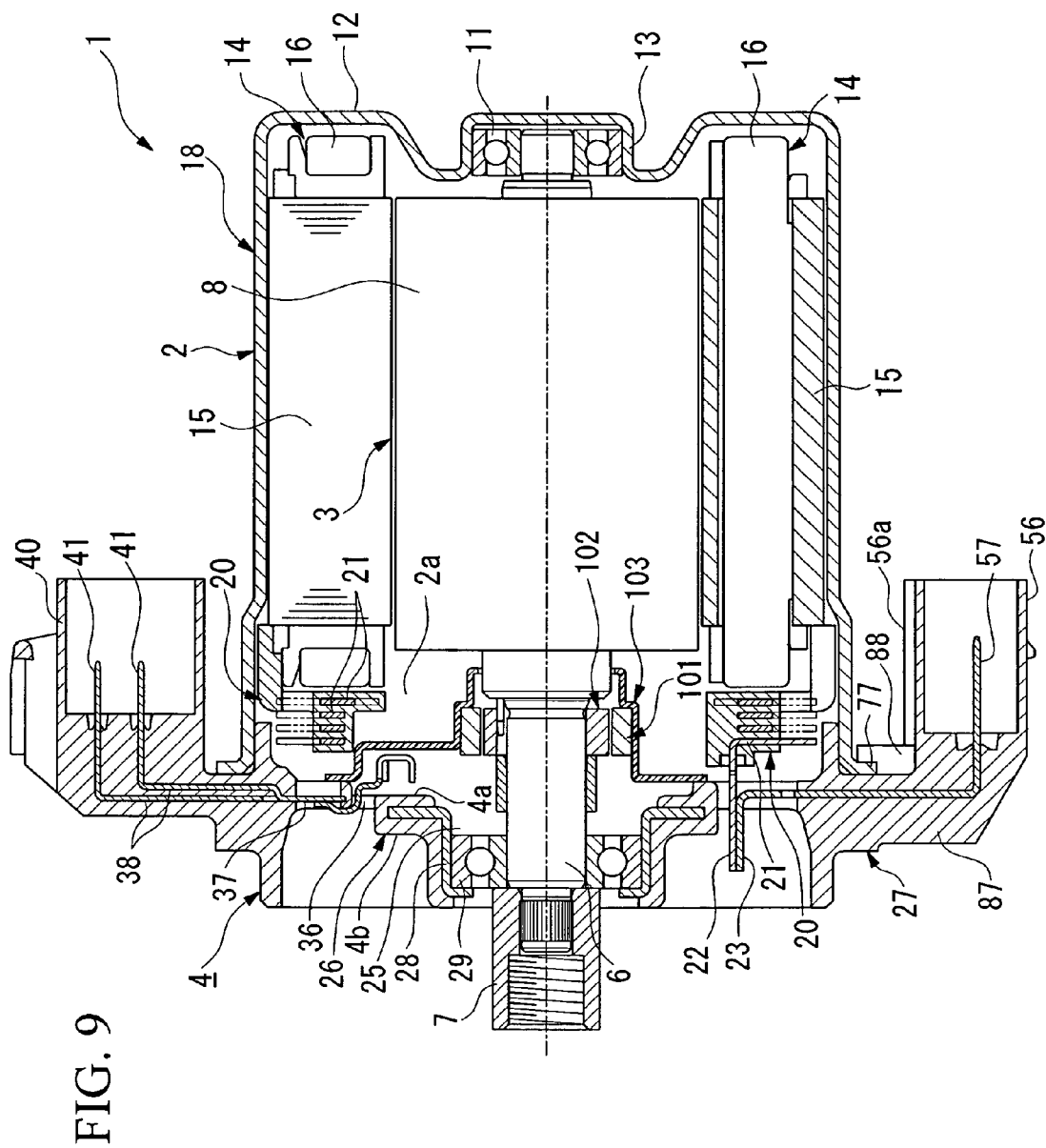
FIG. 9 is a sectional view showing a brushless motor in which a Hall IC is adopted as a rotation detector.

When using the Hall IC, as shown in FIG. 9, Hall ICs 101 are disposed alternatively to the resolver stator 42 at the position, and a sensor magnet 102 which is adhesively fixed to the rotation shaft 6 of the rotor 3 is used alternatively to the resolver rotor 10. Each of the Hall ICs 101 for U, V, and W phases (three pieces in total) is held to a synthetic resin-made sensor holder 103 attached to the bracket 4. In this rotation detector, the rotation position of the rotor is detected by the Hall ICs transmitting signals along with changes of the magnetic pole of the sensor magnet 102.

When using the Hall ICs 101, the bracket 4 and the housing 2 are restrained in rotation by engaging the bracket rib 88 and the slit 78. Therefore, in order to adjust the angle between the Hall ICs 101 and the sensor magnet 102, in a state of the sensor holder 103 to which the Hall ICs 101 are fixed is temporarily fixed to the bracket 4, the sensor holder 103 with the Hall IC 101 is rotated with respect to the bracket 4, and the sensor holder 103 is fixed to the bracket 4 when the output of the Hall IC 101 shows a prescribed value.

INDUSTRIAL APPLICABILITY

According to the present invention, since an engaging device is provided in order to restrain a bracket from moving along a circumferential direction when attaching the bracket to a stator, slippage between the housing (stator) and the bracket can be prevented. When adjusting the rotational position of a rotation detector, the adjustment range can be reduced, and the working efficiency can be improved. Furthermore, since a hole for adjusting the rotation detector can be reduced in size, the layout performance can be improved and the bracket can be reduced in size. In addition, resistance to the vibration or the like can be increased, and the reliability of the brushless motor can be improved.

The invention claimed is:

1. A brushless motor comprising:
a housing;
a stator which is stored and fixed in the housing;
a rotor which is rotatably arranged inside the stator;
a bracket which is fixed to the housing;
a rotation detector which is fixed to the bracket and the housing and detects a rotation position of the rotor; and
an engagement device which restrains movement of the bracket along a circumferential direction with respect to the housing;
wherein the engagement device is provided with a slit which is provided on a periphery of the housing, and a rib which is provided on the bracket and engages the slit; the bracket has a coupler which is provided at a periphery thereof, and to which an electric cable is connected; and the rib of the bracket is provided at a side of the coupler.

2. The brushless motor according to claim 1, wherein the rotation detector is a resolver.

3. The brushless motor according to claim 1, wherein an extension is provided on the periphery of the bracket so as to connect between the periphery of the bracket and the coupler; and the rib is connected to both of the side of the coupler and the extension.

4. The brushless motor according to claim 3, wherein the rib has a square-plate shape, and one side thereof is connected to the side of the coupler while another side thereof is connected to the extension.

5. The brushless motor according to claim 1, wherein the rib and the slit are parallel with an axis of the rotor.

* * * * *